United States Patent
Zhang et al.

(10) Patent No.: US 11,192,727 B2
(45) Date of Patent: Dec. 7, 2021

(54) AUTOMATIC-SENSING TRANSFER DEVICE BASED ON EDGE-TRACING ALIGNMENT ALGORITHM

(71) Applicant: Lishui University, Lishui (CN)

(72) Inventors: Ruihua Zhang, Lishui (CN); Chaojie Chen, Lishui (CN); Linjiao Shen, Lishui (CN)

( * ) Notice: Subject to any disclaimer, the term of this patent is extended or adjusted under 35 U.S.C. 154(b) by 0 days.

(21) Appl. No.: 16/819,105

(22) Filed: Mar. 15, 2020

(65) Prior Publication Data

US 2020/0331707 A1 Oct. 22, 2020

(30) Foreign Application Priority Data

Apr. 17, 2019 (CN) .......................... 201910309110.9

(51) Int. Cl.
*B65G 47/82* (2006.01)
*B65G 47/90* (2006.01)
*B25J 9/04* (2006.01)

(52) U.S. Cl.
CPC .............. *B65G 47/82* (2013.01); *B25J 9/041* (2013.01); *B65G 47/901* (2013.01); *B65G 2203/0225* (2013.01); *B65G 2203/0283* (2013.01); *B65G 2203/044* (2013.01)

(58) Field of Classification Search
CPC .. B65G 47/901; B65G 47/902; B65G 47/904; B65G 47/82; B25J 9/023; B25J 9/1694; B25J 9/1697; B25J 9/041
See application file for complete search history.

(56) References Cited

U.S. PATENT DOCUMENTS

| | | | | | |
|---|---|---|---|---|---|
| 4,187,051 | A | * | 2/1980 | Kirsch ..................... | B25J 9/041 414/744.3 |
| 4,502,830 | A | * | 3/1985 | Inaba ....................... | B25J 18/02 414/735 |
| 4,507,044 | A | * | 3/1985 | Hutchins .................. | B25J 9/041 187/266 |
| 4,642,212 | A | * | 2/1987 | Bailey ..................... | B25J 9/0012 264/262 |
| 4,816,730 | A | * | 3/1989 | Wilhelm, Jr ............. | B25J 9/161 318/568.22 |
| 5,059,089 | A | * | 10/1991 | Kocaoglan ............... | B25J 18/02 414/744.6 |

FOREIGN PATENT DOCUMENTS

GB 2136529 A * 9/1984 .............. B25J 18/02

* cited by examiner

*Primary Examiner* — William R Harp
(74) *Attorney, Agent, or Firm* — W&KIP

(57) ABSTRACT

The invention discloses an automatic-sensing transfer device based on an edge-tracing alignment algorithm, which is characterized by comprising a device body, a rotating device, a lifting device, a stretchable device, a sensing device, a gripping device and a control device. The rotating device, the stretchable device, the lifting device, the sensing device, the gripping device and the control device are all arranged on the device body. The control device is connected to the rotating device, the stretchable device, the lifting device, the gripping device and the sensing device. Accurate positioning of the gripping device can be realized through the transfer device, so that the production efficiency is improved.

6 Claims, 4 Drawing Sheets

AUTOMATIC-SENSING TRANSFER DEVICE BASED ON EDGE-TRACING ALIGNMENT ALGORITHM

CROSS-REFERENCE TO RELATED APPLICATIONS

This application claims priority to Chinese Patent Application No. 201910309110.9 with a filing date of Apr. 17, 2019. The content of the aforementioned application, including any intervening amendments thereto, are incorporated herein by reference.

BACKGROUND OF THE INVENTION

Technical Field

The invention relates to the technical field of transferring, in particular to an automatic-sensing transfer device based on an edge-tracing alignment algorithm.

Description of Related Art

Mechanical grippers are usually used in modern production to transfer goods or parts in one procedure to the next procedure to guarantee the continuity between different procedures. However, by adoption of such transfer operation, the positioning accuracy of the mechanical grippers is low, and the production efficiency is affected.

BRIEF SUMMARY OF THE INVENTION

The objective of the invention is to provide an automatic-sensing transfer device based on an edge-tracing alignment algorithm to solve the problems put forward in the description of related art.

To fulfill the above objective, the following technical solution is adopted by the invention:

An automatic-sensing transfer device based on an edge-tracing alignment algorithm comprises a device body, a rotating device, a lifting device, a stretchable device, a sensing device, a gripping device and a control device, wherein the rotating device, the stretchable device, the lifting device, the sensing device, the gripping device and the control device are all arranged on the device body, and the control device is connected to the rotating device, the stretchable device, the lifting device, the gripping device and sensing device.

A base plate is arranged on the device body.

The rotating device comprises a driving gear, a first stepping motor and a driven gear, wherein the first stepping motor is fixedly arranged under the base plate, an output shaft of the first stepping motor penetrates through the base plate to be connected to the driving gear, the driving gear and the driven gear are both arranged on the base plate, and the driven gear is movably connected to the base plate and is engaged with the driving gear.

The lifting device comprises an upper support plate, a lower support plate, a first lead screw, support rods, a first lead screw nut, and a second stepping motor, wherein the lower support plate is arranged above the driven gear and is fixedly connected to the central axis of the driven gear; the first lead screw and the support rods are arranged between the upper support plate and the lower support plate in parallel and are perpendicular to the upper support plate and the lower support plate; the number of the support rods is two, and the two support rods are respectively arranged on the left side and the right side of the first lead screw; the first lead screw nut is arranged on the first lead screw; and the second stepping motor is fixedly arranged above the upper support plate, and an output shaft of the second stepping motor penetrates through the upper support plate to be connected to the first lead screw.

The stretchable device comprises a third stepping motor, a connecting plate, a second lead screw, a second lead screw nut, bracket plates, and first sliding rods, wherein the connecting plate has a side face, an upper surface, and a groove formed in the upper surface, and the side face of the connecting plate is fixedly connected to a side face of the first lead screw nut; the number of the bracket plates is two, and the two bracket plates are respectively a first bracket plate and a second bracket plate which are arranged at the front end and the rear end of the groove respectively; the third stepping motor is arranged at the rear end of the second bracket plate and is fixedly connected to the upper surface of the connecting plate, and an output shaft of the third stepping motor is movably connected to the second bracket plate and penetrates through the second bracket plate to be fixedly connected to one end of the second lead screw; the other end of the second lead screw is movably connected to the first bracket plate, and the second lead screw nut is arranged on the second lead screw; the number of the first sliding rods is two, and the two first sliding rods are respectively arranged on sides, away from the first lead screw, of the two support rods; and first connecting pieces are arranged on the side face of the connecting plate and are slidably connected to the two first sliding rods.

The gripping device comprises a steering engine, a first clamping plate, a second clamping plate, a second sliding rod, a positioning block, a mounting plate, and a second connecting piece, wherein the second connecting piece has an upper mounting face and a side mounting face perpendicular to the upper mounting face; the mounting plate is fixedly arranged below the second lead screw nut; one end of the second sliding rod is fixedly connected to the mounting plate, the other end of the second sliding rod penetrates through the positioning block to be connected to the side mounting face of the second connecting piece, and the second sliding rod is slidably connected to the positioning block; a first end of the first clamping plate is provided with a first gear and has an S-shaped clamping face extending to a second end; an output shaft of the steering engine penetrates through the upper mounting face of the second connecting piece to be fixedly connected to the center of the first gear at the first end of the first clamping plate; a first end of the second clamping plate is provided with a second gear, has an S-shaped clamping face extending towards a second end, and is movably connected to the upper mounting face of the second connecting piece; the second clamping plate and the first clamping plate are arranged in a mirror symmetry manner, and the first gear is engaged with the second gear; and limit switches are arranged on the outer side of the first clamping plate and the outer side of the second clamping plate.

The sensing device 6 comprises a sensor and a sensor holder, wherein the sensor is fixed to the gripping device through the sensor holder, and the sensor is an infrared sensor.

The control device 7 comprises a microcontroller.

A using method of an automatic-sensing transfer device based on an edge-tracing alignment algorithm comprises the following steps:

(1) First of all, disposing a plurality of storage platforms, a feeding platform for storing to-be-transferred goods and a discharging platform for storing transferred goods near a device;

(2) Starting a control device which in turn starts a first stepping motor, adjusting the angle of a gripping device, and searching for required goods by an infrared sensor;

(3) Recording, when the infrared sensor senses the goods for the first time, a current position, continuing to rotate the first stepping motor until the infrared sensor detects the other side of the goods, then working out, by a microcontroller, a rotation angle of the first stepping motor to the center of the goods based on an edge-tracing alignment algorithm, outputting pulses to the first stepping motor, and then rotating the first stepping motor to align the front end of the gripping device to the center of the goods, so that accurate positioning of the gripping device is realized;

(4) Performing detection and feedback synchronously by the infrared sensor; when the distance is greater than 6 mm, outputting a pulse signal to a third stepping motor by the microcontroller to enable the front end of the gripping device to continuously draw close to the goods; when the distance is 6 mm, stopping the third stepping motor, controlling a steering engine to open a first clamping plate and a second clamping plate on the gripping device, controlling the steering engine to rotate the first clamping plate and the second clamping plate by an angle to clamp goods when limit switches on the outer side of the first clamping plate and the outer side of the second clamping plate are triggered, and rotating a lead screw by the third stepping motor to restore the gripping device; and (5) Processing a difference between the current position and an initial position to figure out the number of rotation pulses and outputting a pulse signal to the first stepping motor, by the microcontroller; rotating the first stepping motor which in turn lowers the gripping device to an angle corresponding to the discharging platform, outputting, by the microcontroller, a pulse signal to a second stepping motor which in turn rotates to lower the goods to the discharging platform, starting the steering engine to open the first clamping plate and the second clamping plate on the steering engine, and finally, lifting, by the second stepping motor, the gripping device to an original height to complete transferring.

The edge-tracing alignment algorithm comprises the following steps:

Recording: a rotation angle A of the first stepping motor is recorded when the infrared sensor detects one side of the goods, and a rotation angle B of the first stepping motor is recorded when the infrared sensor detects the other side of the goods;

Calculation: a rotation angle of the first stepping motor from the initial position to the center of the goods is (A+B)/2.

Compared with the prior art, the invention has the following technical effects:

Accurate positioning of the gripping device can be realized through the transfer device of the invention, so that the production efficiency is improved.

DETAILED DESCRIPTION OF THE INVENTION

Figure 1:
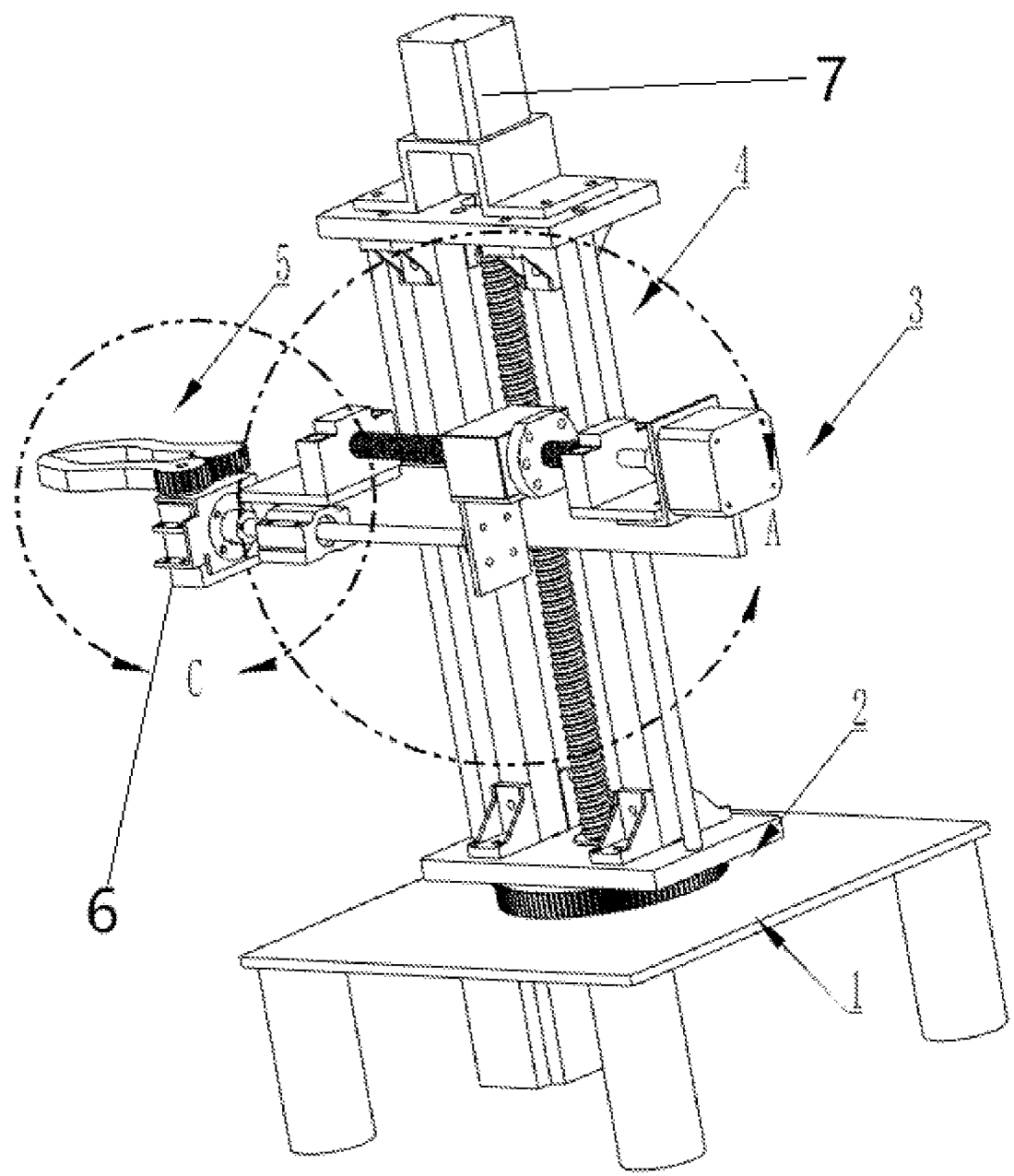
FIG. 1 is a perspective view of the invention.
Figure 2:
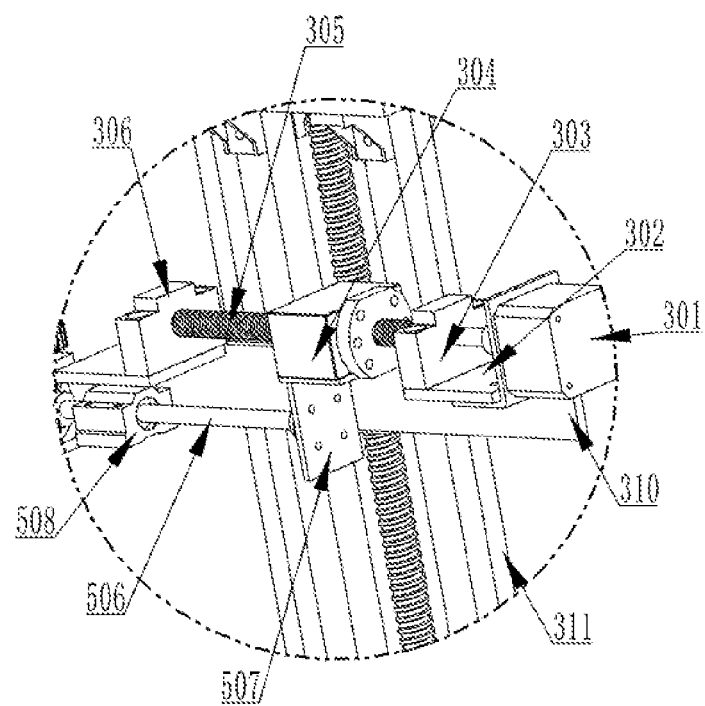
FIG. 2 is an enlarged view of part A in FIG. 1.
Figure 3:
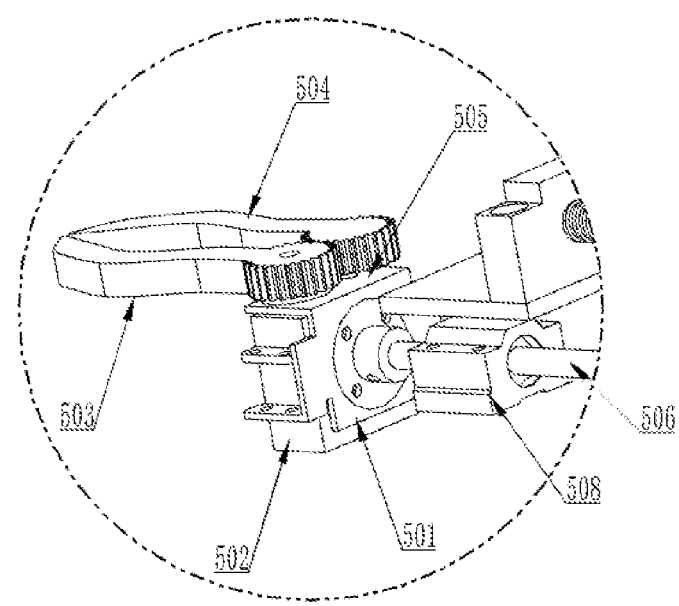
FIG. 3 is an enlarged view of part C in FIG. 1.
Figure 4:
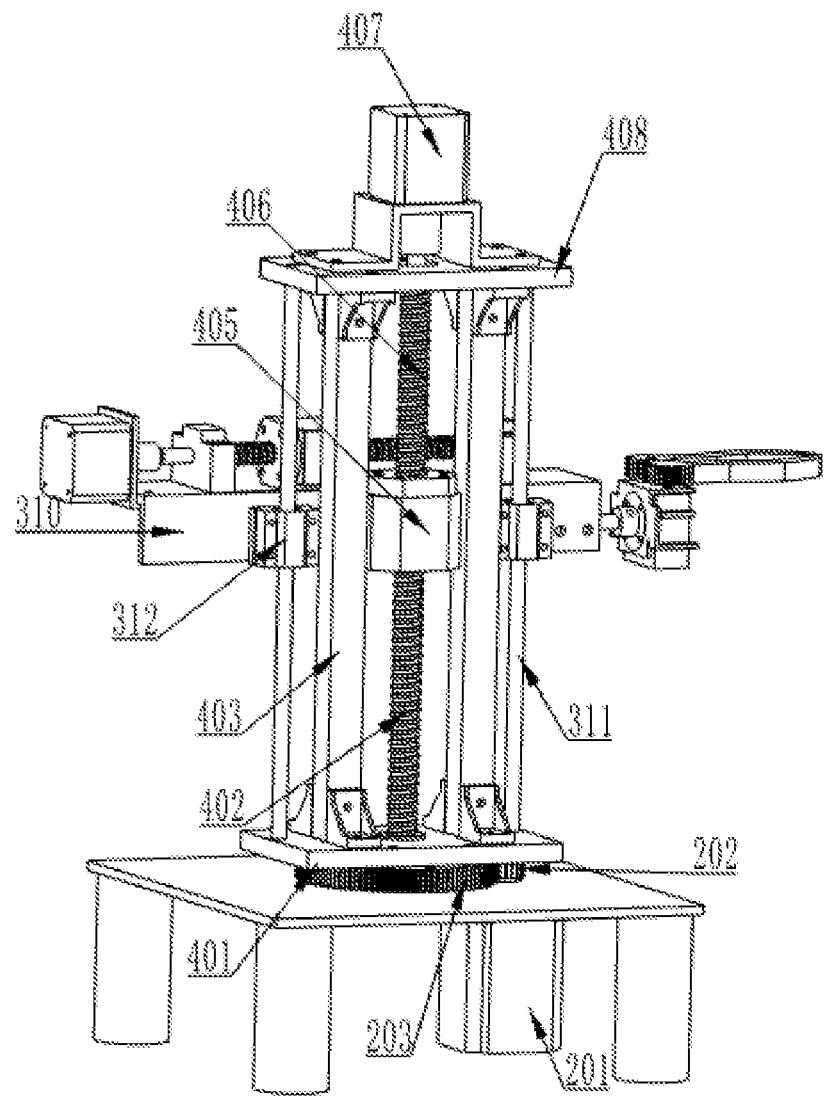
FIG. 4 is another perspective view of the invention.

The invention is further described below in combination with the accompanying drawings and embodiments.

As shown in the figures, an automatic-sensing transfer device based on an edge-tracing alignment algorithm comprises a device body, a rotating device 2, a lifting device 4, a stretchable device 3, a sensing device 6, a gripping device 5, and a control device 7, wherein the rotating device 2, the stretchable device 3, the lifting device 4, the sensing device 6, the gripping device 5 and the control device 7 are all arranged on the device body, and the control device 7 is connected to the rotating device 2, the stretchable device 3, the lifting device 4, the gripping device 5 and the sensing device 6.

A base plate 1 is arranged on the device body.

The rotating device 2 comprises a driving gear 202, a first stepping motor 201, and a driven gear 203, wherein the first stepping motor 201 is fixedly arranged under the base plate 1, an output shaft of the first stepping motor 201 penetrates through the base plate 1 to be connected to the driving gear 202, the driving gear 202 and the driven gear 203 are both arranged on the base plate 1, and the driven gear 203 is movably connected to the base plate 1 and is engaged with the driving gear 202; and the height of the driven gear 203 is greater than that of the driving gear 202.

The lifting device 4 comprises an upper support plate 408, a lower support plate 401, a first lead screw 402, support rods 403, a first lead screw nut 405, and a second stepping motor 407, wherein the lower support plate 401 is arranged above the driven gear 203 and is fixedly connected to the central axis of the driven gear 203; the first lead screw 402 and the support rods 403 are arranged between the upper support plate 408 and the lower support plate 401 in parallel and are perpendicular to the upper support plate 408 and the lower support plate 401; the number of the support rods 403 is two, and the two support rods 403 are respectively arranged on the left side and the right side of the first lead screw 402; the first lead screw nut 405 is arranged on the first lead screw 402; and the second stepping motor 407 is fixedly arranged above the upper support plate 408, and an output shaft of the second stepping motor 407 penetrates through the upper support plate 408 to be connected to the first lead screw 402.

The stretchable device comprises a third stepping motor 301, a connecting plate, a second lead screw 305, a second lead screw nut 304, bracket plates, and first sliding rods 311, wherein the connecting plate has a side face 310, an upper surface 302, and a groove formed in the upper surface 302, and the side face 310 of the connecting plate is fixedly connected to a side face of the first lead screw nut 405; the number of the bracket plates is two, and the two bracket plates are respectively a first bracket plate 306 and a second bracket plate 303 which are arranged at the front end and the rear end of the groove respectively; the third stepping motor 301 is arranged at the rear end of the second bracket plate 303 and is fixedly connected to the upper surface 302 of the connecting plate, and an output shaft of the third stepping motor 301 is movably connected to the second bracket plate 303 and penetrates through the second bracket plate 303 to be fixedly connected to one end of the second lead screw 305; the other end of the second lead screw 305 is movably connected to the first bracket plate 306, and the second lead screw nut 304 is arranged on the second lead screw 305; the number of the first sliding rods 311 is two, and the two first sliding rods 311 are respectively arranged on sides, away from the first lead screw 402, of the two support rods 403; and first connecting pieces 312 are arranged on the side face 310 of the connecting plate and are slidably connected to the two first sliding rods 311.

The gripping device comprises a steering engine 502, a first clamping plate 503, a second clamping plate 504, a second sliding rod 506, a positioning block 508, a mounting plate 507, and a second connecting piece, wherein the second connecting piece has an upper mounting face 505 and a side mounting face 501 perpendicular to the upper mounting face 505; the mounting plate 507 is fixedly arranged below the second lead screw nut 304; one end of the second sliding rod 506 is fixedly connected to the mounting plate 507, the other end of the second sliding rod 506 penetrates through the positioning block 508 to be connected to the side mounting face 501 of the second connecting piece, and the second sliding rod 506 is slidably connected to the positioning block 508; a first end of the first clamping plate 503 is provided with a first gear and has an S-shaped clamping face extending to a second end; an output shaft of the steering engine 502 penetrates through the upper mounting face 505 of the second connecting piece to be fixedly connected to the center of the first gear at the first end of the first clamping plate 503; a first end of the second clamping plate 504 is provided with a second gear, has an S-shaped clamping face extending towards a second end, and is movably connected to the upper mounting face 505 of the second connecting piece; the second clamping plate 504 and the first clamping plate 503 are arranged in a mirror symmetry manner, and the first gear is engaged with the second gear; and limit switches are arranged on the outer side of the first clamping plate 503 and the outer side of the second clamping plate 504.

The sensing device 6 comprises a sensor and a sensor holder, wherein the sensor is fixed to the gripping device 5 through the sensor holder, and the sensor is an infrared sensor.

The control device 7 comprises a STC89C52 microcontroller.

A using method of an automatic-sensing transfer device based on an edge-tracing alignment algorithm comprises the following steps:

(1) First of all, a plurality of storage platforms, a feeding platform for storing to-be-transferred goods and a discharging platform for storing transferred goods are disposed near a device;

(2) A control device is started to start a first stepping motor 201, the angle of a gripping device 5 is adjusted, and an infrared sensor is used for searching for required goods.

(3) When the infrared sensor senses the goods for the first time, the rotation angle of the first stepping motor 201 at this moment is recorded, the first stepping motor 201 continues to rotate until the infrared sensor detects other side of the goods, the rotation angle of the first stepping motor 201 at this moment is recorded, a microcontroller works out the rotation angle of the first stepping motor 201 to the center of the goods through an edge-tracing alignment algorithm and outputs pulses to the first stepping motor 201, and then the first stepping motor 201 rotates to align the front end of the gripping device 5 to the center of the goods, so that accurate positioning of the gripping device is realized.

(4) The infrared sensor performs detection and feedback synchronously; when the distance is greater than 6 mm, the microcontroller outputs a pulse signal to a third stepping motor 301 to enable the front end of the gripping device 5 to continuously draw close to the goods; when the distance is 6 mm, the third stepping motor 301 is stopped, a steering engine 502 is controlled to open a first clamping plate 503 and a second clamping plate 504 on the gripping device 5; when limit switches on the outer side of the first clamping plate 503 and the outer side of the second clamping plate 504 are triggered, the steering engine 502 is controlled to rotate the first clamping plate 503 and the second clamping plate 504 to rotate by an angle to clamp the goods; and then, the third stepping motor 301 rotates a lead screw to restore the gripping device 5.

(5) The microcontroller processes a difference between the current position and an initial position to figure out the number of rotation pulses and then outputs a pulse signal to the first stepping motor 201 which in turn rotates the gripping device 5 to an angle corresponding to the discharging platform, then the microcontroller outputs a pulse signal to a second stepping motor 407 which in turn rotates to lower the goods to the discharging platform, the steering engine 502 is started to open the first clamping plate 503 and the second clamping plate 504 on the gripping device 5, and finally, the second stepping motor 407 lifts the gripping device 5 to the original height to complete transferring.

The edge-tracing alignment algorithm comprises the following steps:

Recording: a rotation angle A of the stepping motor 1201 is recorded when the infrared sensor detects one side of the goods, and a rotation angle B of the stepping motor 1201 is recorded when the infrared sensor detects the other side of the goods; and Calculation: a rotation angle of the stepping motor 1201 from the initial position to the center of the goods is (A+B)/2.

The above embodiments are only preferred ones of the invention, and are not intended to limit the invention. Any modifications and equivalent substitutions and improvements made on the basis of the spirit and principle of the invention should also fall within the protection scope of the invention.

We claim:

1. An automatic-sensing transfer device based on an edge-tracing alignment algorithm, comprising a device body, a rotating device, a lifting device, a device capable of being stretched, a sensing device, a gripping device and a control device, wherein the rotating device, the stretchable device, the lifting device, the sensing device, the gripping device and the control device are all arranged on the device body, and the control device is connected to the rotating device, the stretchable device, the lifting device, the gripping device and sensing device, wherein a base plate is arranged on the device body, and wherein the rotating device comprises a driving gear, a first stepping motor and a driven gear, the first stepping motor is fixedly arranged under the base plate, an output shaft of the first stepping motor penetrates through the base plate to be connected to the driving gear, the driving gear and the driven gear are both arranged on the base plate, and the driven gear is movably connected to the base plate and is engaged with the driving gear.

2. The automatic-sensing transfer device based on an edge-tracing alignment algorithm according to claim 1, wherein the lifting device comprises an upper support plate, a lower support plate, a first lead screw, support rods, a first lead screw nut, and a second stepping motor; the lower support plate is arranged above the driven gear and is fixedly connected to a central axis of the driven gear; the first lead screw and the support rods are arranged between the upper support plate and the lower support plate in parallel and are perpendicular to the upper support plate and the lower support plate; the number of the support rods is two, and the two support rods are respectively arranged on a left side and a right side of the first lead screw; the first lead screw nut is arranged on the first lead screw; and the second stepping motor is fixedly arranged above the upper support plate, and an output shaft of the second stepping motor penetrates through the upper support plate to be connected to the first lead screw.

3. The automatic-sensing transfer device based on an edge-tracing alignment algorithm according to claim 2, wherein the stretchable device comprises a third stepping motor, a connecting plate, a second lead screw, a second lead screw nut, bracket plates, and first sliding rods; the connecting plate has a side face, an upper surface, and a groove formed in the upper surface, and the side face of the connecting plate is fixedly connected to a side face of the first lead screw nut; the number of the bracket plates is two, and the two bracket plates are respectively a first bracket plate and a first bracket plate which are arranged at a front end and a rear end of the groove respectively; the third stepping motor is arranged at a rear end of the second bracket plate and is fixedly connected to the upper surface of the connecting plate, and an output shaft of the first stepping motor is movably connected to the second bracket plate and penetrates through the second bracket plate to be fixedly connected to an end of the second lead screw; an end of the second lead screw is movably connected to the first bracket plate, and the second lead screw nut is arranged on the second lead screw; the number of the first sliding rods is two, and the two first sliding rods are respectively arranged on sides, away from the first lead screw, of the two support rods; and first connecting pieces are arranged on the side face of the connecting plate and are slidably connected to the two first sliding rods.

4. The automatic-sensing transfer device based on an edge-tracing alignment algorithm according to claim 3, wherein the gripping device comprises a steering engine, a first clamping plate, a second clamping plate, a second sliding rod, a positioning block, a mounting plate, and a first connecting piece; the second connecting piece has an upper mounting face and a side mounting face perpendicular to the upper mounting face; the mounting plate is fixedly arranged below the second lead screw nut; the second sliding rod has an end fixedly connected to the mounting plate and an end penetrating through the positioning block to be connected to the side mounting face of the second connecting piece, and the second sliding rod is slidably connected to the positioning block; a first end of the first clamping plate is provided with a gear and has an S-shaped clamping face extending to a second end; an output shaft of the steering engine penetrates through the upper mounting face of the second connecting piece to be fixedly connected to a center of the first gear at the first end of the first clamping plate; a first end of the first clamping plate is provided with a second gear, has an S-shaped clamping face extending towards a second end, and is movably connected to the upper mounting face of the second connecting piece; the second clamping plate and the first clamping plate are arranged in a mirror symmetry manner, and the first gear is engaged with the second gear; and limit switches are arranged on an outer side of the first clamping plate and an outer side of the second clamping plate.

5. The automatic-sensing transfer device based on an edge-tracing alignment algorithm according to claim 4, wherein the sensing device comprises a sensor and a sensor holder, the sensor is fixed to the gripping device through the sensor holder, and the sensor is an infrared sensor.

6. The automatic-sensing transfer device based on an edge-tracing alignment algorithm according to claim 1, wherein the control device comprises a microcontroller.

\* \* \* \* \*